(12) United States Patent
Betchley

(10) Patent No.: US 8,085,466 B2
(45) Date of Patent: Dec. 27, 2011

(54) OPTICAL SYSTEM OF LIGHT GATHERING USING ORTHOGONAL COMPRESSIONS TO FORM LARGE DIAMETER, SHALLOW DEPTH TELESCOPES

(75) Inventor: Curtlan C. Betchley, Marysville, WA (US)

(73) Assignee: The Boeing Company, Chicago, IL (US)

( * ) Notice: Subject to any disclaimer, the term of this patent is extended or adjusted under 35 U.S.C. 154(b) by 561 days.

(21) Appl. No.: 12/188,505

(22) Filed: Aug. 8, 2008

(65) Prior Publication Data

US 2010/0033808 A1   Feb. 11, 2010

(51) Int. Cl.
*G02B 17/00* (2006.01)
*G02B 23/00* (2006.01)

(52) U.S. Cl. ........ 359/366; 359/399; 359/852; 359/861; 359/867

(58) Field of Classification Search .......... 359/364–366, 359/399, 422, 846, 850–853, 857, 858, 861–863, 359/865, 867
See application file for complete search history.

(56) References Cited

U.S. PATENT DOCUMENTS

| | | | |
|---|---|---|---|
| 3,811,749 A | 5/1974 | Abel | |
| 4,634,276 A * | 1/1987 | Sharpe | 356/305 |
| 4,927,256 A | 5/1990 | Lacuve | |
| 5,016,995 A * | 5/1991 | Pullen, V | 359/366 |
| 5,078,502 A | 1/1992 | Cook | |
| 5,108,168 A | 4/1992 | Norbert et al. | |
| 5,227,923 A * | 7/1993 | Kebo | 359/859 |
| 5,331,470 A | 7/1994 | Cook | |
| 5,640,283 A | 6/1997 | Warren | |
| 5,893,549 A * | 4/1999 | Pina et al. | 359/846 |
| 5,905,591 A | 5/1999 | Duncan et al. | |
| 5,919,128 A | 7/1999 | Fitch | |
| 6,061,175 A * | 5/2000 | Watters | 359/366 |
| 6,084,727 A | 7/2000 | Cook | |
| 6,118,579 A | 9/2000 | Endemann | |
| 6,178,047 B1 | 1/2001 | Cook | |
| 6,705,736 B1 | 3/2004 | Pressler | |
| 6,767,103 B2 | 7/2004 | Cook | |
| 7,021,778 B1 | 4/2006 | Zaugg | |
| 7,553,035 B2 * | 6/2009 | Wright | 359/851 |
| 2003/0227696 A1 * | 12/2003 | Maker | 359/850 |
| 2005/0237644 A1 * | 10/2005 | Rhoads | 359/872 |
| 2008/0123205 A1 * | 5/2008 | Nakano et al. | 359/859 |

* cited by examiner

*Primary Examiner* — Frank G Font
(74) *Attorney, Agent, or Firm* — Armstrong Teasdale LLP

(57) ABSTRACT

Optical system for a telescope having independent optical arms adapted to collect light rays over a first cross sectional area and compress it into a second cross sectional area less than the first cross sectional area. Orthogonal mirror pairs of parabolic trough mirrors compress light in first one dimension and then the other dimension and feed the light into a focusing smaller telescope structure. The gathered light is kept parallel and its wavefront is kept in phase, allowing the telescope to have the diffraction limit of the collective aperture. The optical arms are independently adjustable to point the system toward different objects of interest and track them.

20 Claims, 9 Drawing Sheets

OPTICAL SYSTEM OF LIGHT GATHERING USING ORTHOGONAL COMPRESSIONS TO FORM LARGE DIAMETER, SHALLOW DEPTH TELESCOPES

BACKGROUND OF THE DISCLOSURE

The disclosure relates generally to optical systems for telescopes, and more specifically to diffraction limited high angular resolution optical systems having large light collection diameters compared to their depth. The example application put forth in the disclosure is for astronomical telescopes.

Large astronomical telescopes have large primary light gathering mirrors in the form of a surface that is usually a section of a paraboloid, (parabola rotated about its axis). The primary may be a single mirror or a compound mirror composed of smaller sections, but the basic surface shape has two dimensional curvature. To support the primary mirror, large movable supporting structures, sometimes referred to as superstructures, are needed. To point to and track objects of interest, such as stars, the entire telescope, including the primary and secondary mirrors, must be physically moved by the supporting superstructure. Moving and accurately positioning such large and heavy mirrors within a superstructure that also rotates involves complicated actuator and control systems. The mirrors, the supporting structures, and the mechanisms are massive, and are costly to construct and maintain. For example, efforts are currently being made to construct telescopes having collection diameters as large as thirty meters, (98 feet). The width of the supporting superstructure will be forty or more meters and have a similar or greater height.

The function of a telescope is two fold. First, it is to collect a sufficient amount of light to be able to see, (or photograph), dim often distant objects. Second, it is to focus the light to from an image to be seen or photographed. The size, or diameter, of the telescope matters for both tasks, because the amount of light collected depends on the collection area, and the degree to which the light can be focused depends, among other things, on the diffraction limit set by the primary's diameter. Off axis aberrations also affect image resolution, and these are reduced by using a long focal length in comparison to the primary's diameter, (large f/#). This makes the parabolic shape closer to that of a section of a circle, but it puts the secondary and image plane far away, leading to a large telescope depth, (or height). Existing astronomical telescopes simultaneously both gather the light and focus it by using primary mirrors having compound curvature surfaces. Although the light gathering and light focusing could be separated, there is no advantage in doing this using a single primary surface. To illustrate, the light gathering could be done by using paraboloid sections for the primary and secondary mirrors aligned on their axes with a common focus. The primary gathers axial parallel light over a large collection area, and compresses it into a comparatively smaller area of axial parallel light after reflection from the secondary, conserving radiance in the process. This could then be focused by a smaller telescope. The mirrors, superstructure, and mechanisms needed, however, would be no less massive, complex, or costly than for the existing telescope.

Large astronomical telescopes, ten meters or more in diameter, have become practical due to adaptive optics. Adaptive optics removes atmospheric distortion by making fine adjustments in the positions of mirrors in the light path up to thousands of times per second. As large telescopes move to track objects, other slower rate adaptive adjustments are made to the main mirrors to keep their surfaces correctly positioned and objects focused. Because of the compound curvature of the primary mirror, its' geometric shape cannot be greatly adjusted by deforming it, without compression or tension stresses in the material, usually glass, becoming unacceptable. This is one reason for using many separate smaller sections to form a primary mirror. The depth of existing astronomical telescopes is often reduced by utilizing folded optical paths to accommodate the long focal lengths. To accommodate different observational tasks, the optical paths are often movable. The size and weight of such telescopes, however, remains substantial, and the physical depth required just to point the telescope in different directions, is still at a minimum the diameter of the primary. Additionally, movable and folded optical systems also often suffer from greater alignment difficulties.

Astronomical telescopes are now being built at a size once believed not possible. However, aside from the sheer cost considerations of building ever lager versions, the ability to handle the weight and the inertia of large and massive moving optical parts and their supporting structure present real constraints on telescope construction. The construction of even higher resolution astronomical telescopes may thus be limited using the current design approach. In addition, applications needing long focal length telescopes in situations that do not have the necessary physical depth, could benefit from a new design approach.

BRIEF DESCRIPTION OF THE DISCLOSURE

In one aspect, an optical system to gather and compress light is disclosed that comprises an optical arm comprising a first mirror pair and a second mirror pair. The second mirror pair is arranged in an optical train orthogonal to the first mirror pair, and each of the first and second mirror pairs is adapted to compress a cross sectional area of gathered light rays to a reduced cross sectional area, while substantially maintaining an incident axial parallel light beam with planar wave front, both parallel and planar respectively.

The mirrors in each of the mirror pairs are curved in one dimension and are substantially flat in the orthogonal dimension. Nominally, the mirrors are parabolic trough mirrors. Specifically each of the first mirror pair and the second mirror pair may include parabolic trough mirrors opposing one another, that nominally have a common focal line. The first mirror in a mirror pair may constitute a compressor mirror, and the second mirror in a mirror pair may constitute a parallelizer mirror. The first mirror pair and the second mirror pair may comprise an initial mirror pair, and a cross mirror pair, with the cross mirror pair being fed light from the initial mirror pair. One of the first and second mirror pairs may include a first mirror and a second mirror each having a concave side and a convex side, with the concave sides facing one another. Alternatively, the concave sides may face in the same direction. The light gathered from the first and second mirror pair may be directed into a focusing telescope that may be a Cassegrain, Schmidt, or other type telescope.

The optical arm may be pointed to receive light from different directions by adjusting each of its mirrors individually rather than rotating the arm as a whole. At least one of the mirrors in the first and second mirror pairs may have a variable parabolic shape. At least one of the distances between opposing mirrors in the first and second mirror pairs may be adjustable.

In another aspect, an astronomical telescope system is disclosed. The system comprises a telescope and an optical system. The optical system comprises a plurality of independent optical arms feeding light into the telescope. Each arm may be of the type disclosed above in paragraphs [0006], [0007], and [0008]. The first mirror of the first mirror pair in each of the optical arms, constitutes an individual aperture. The plurality of optical arms forms a multiple aperture composed of individual apertures. The individual apertures may be arranged in an annular ring as an odd number of identical individual apertures, equally spaced, and covering at least half the annular area. This arrangement contains all baselines across the outside diameter of the annular ring, and forms a Golay type aperture with substantially the diffraction limit of the outside diameter of the annular ring. The optical system gathers light rays over the multiple aperture cross sectional area and compresses the gathered light rays to a second cross sectional area that is less than the first cross sectional area. The light rays from the second cross sectional area enter the focusing part of the telescope. The telescope comprises a multi-aperture Golay type telescope.

DETAILED DESCRIPTION

Optical methods and systems for telescopes that squeeze or compress light sequentially in two dimensions are disclosed hereinbelow that facilitate construction of large diameter, high resolution astronomical telescopes having relatively shallow depth compared to existing telescope systems. The optical systems and methods provide high resolution telescope imaging in a reduced amount of physical space, and with reduced weight compared to existing large diameter astronomical telescopes having paraboloid shaped mirrors, thereby allowing for smaller and less expensive supporting structures to be utilized. The reduced size and physical mass accordingly reduces resultant inertia for repositioning or aligning the optical elements to point them toward an object of interest, potentially allowing for lower cost actuating and control components to be utilized. In certain embodiments, smaller optical components may be individually moved or flexed for image tracking of a single moving object relative to the telescope, as opposed to moving a much larger optical system in its entirety, thereby providing opportunities to reduce costs associated with larger and more powerful actuating systems and associated control systems.

Such advantages and benefits are realized at least in part through the use of optics that separate the light gathering aspects from the light focusing aspects in a telescope optical system. Such separation of light gathering and light focusing allows a much smaller telescope to focus the light after it has been gathered and squeezed into a much smaller cross-sectional area than the aperture area in which it was gathered. The compression of light into the smaller area is achieved by a unique arrangement of reflective mirrors having different sizes and arranged in two sets or pairs. One of the sets or pairs is sometimes referred to herein as an initial pair and the other of the mirror sets or pairs is sometimes referred to as a cross pair. The arrangement of mirrors is discussed in detail below. It is advantageous in many aspects, some of which are believed to be apparent and some of which are specifically described below.

Figure 1:
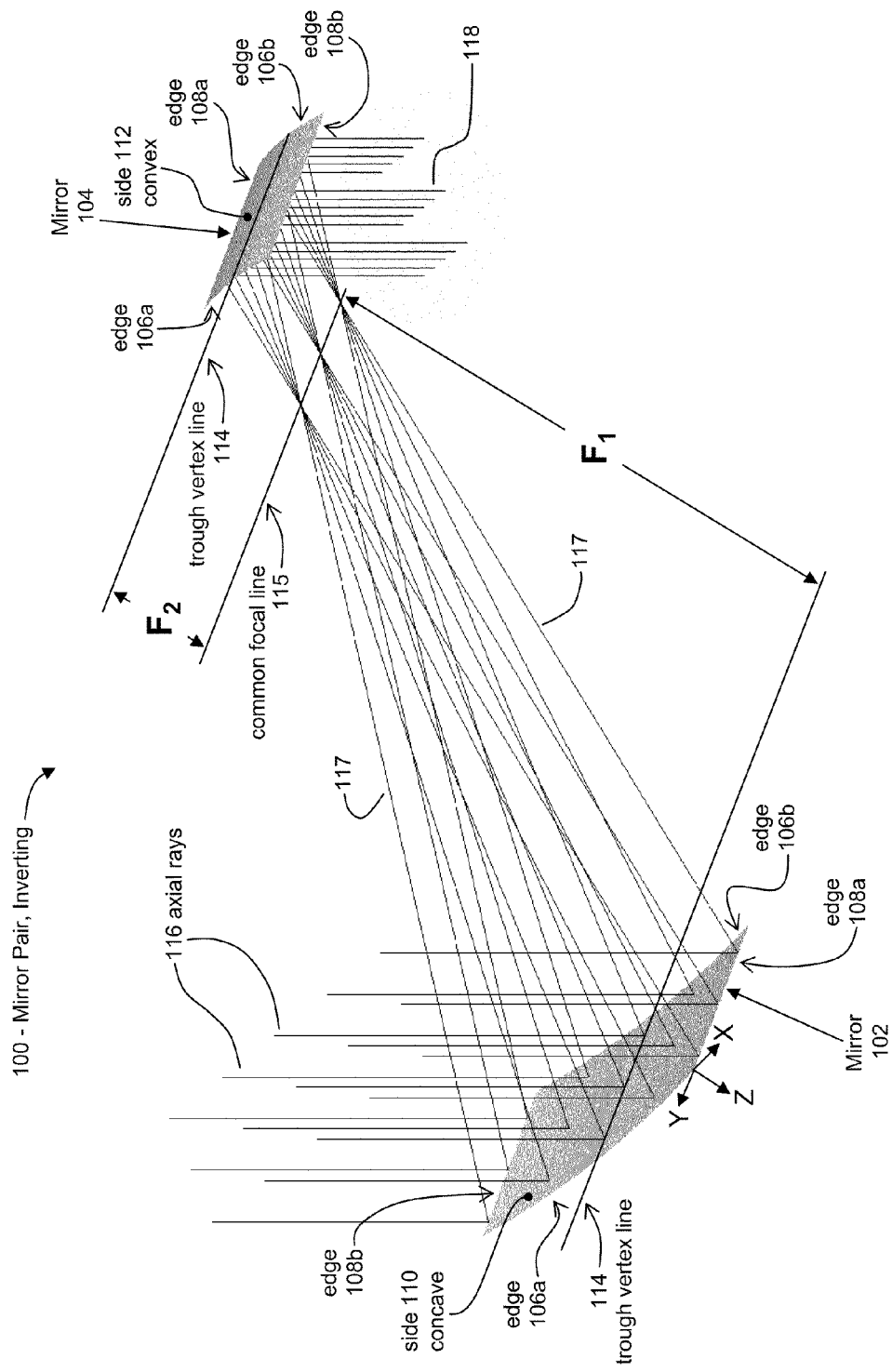
FIG. 1 illustrates a first mirror pair arrangement for a telescope, with the mirrors compressing axial light rays along a first dimension.

More specifically, and referring now to FIG. 1, an exemplary initial set or pair 100 of light gathering reflective mirrors 102, 104 for a telescope system is illustrated. As shown in the exemplary embodiment of FIG. 1, the mirrors 102 and 104 may be formed in and provided as parabolic trough shapes. Unlike known paraboloid surfaces having a compound curvature that are often utilized in existing astronomical telescope systems, the parabolic trough mirrors 102, 104 provide a simple single curvature reflective surface. That is, considering an x, y, z Cartesian coordinate system in FIG. 1, the mirror 102 is parabola shaped in cross section through a plane defined by axes x and z in FIG. 1, but is not curved in cross section through a plane defined by axes y and z in FIG. 1. These two planes are perpendicular or orthogonal. As seen in FIG. 1, the mirror 102 and 104 are differently sized, with the mirror 102 being larger than the mirror 104.

Alternatively stated, and as shown in the FIG. 1, the mirrors 102, 104 may each be defined by a first set of end edges 106a and 106b opposing one another and a second set of end edges 108a and 108b also opposing one another and connecting with the first end edges 106a and 106b. The first set of end edges 106a and 106b in each mirror 102 and 104 is curved and parallel while the second set of end edges 108a and 108b is generally straight and parallel. The first set of end edges 106a and 106b are smoothly curved in a parabolic shape, while the second set of end edges 108a and 108b are substantially straight and linear without any contour or curvature. As such, the first set of end edges 106a and 106b define a curved surface extending therebetween having a concave side surface 110 and a convex side surface 112 for each mirror 102 and 104. The mirrors 102 and 104 are not curved, however, in a direction parallel to the second set of end edges 108a and 108b.

Each of the parabolic trough mirrors 102 and 104 has a focal length $F_1$ and $F_2$, respectively, given by the distance from a trough vertex line 114 to a trough focal line 115. In an exemplary embodiment, the initial pair 100 of parabolic trough mirrors 102 and 104 having different sizes, are positioned relative to one another so that the concave side surfaces 110 face one another, inverting configuration, and so that their respective focal lines 115 coincide as shown in FIG. 1. As such, axial light rays 116 reflected from the mirror 102, rays 117, pass through the common focal lines 115 between the two mirrors 102 and 104. The light rays 118 reflected from mirror 104 are squeezed together or compressed in the x axis only, compared to the incident axial light rays 116. The amount of compression in terms of a compression factor is given by the ratio of the focal lengths $F_1/F_2$. For axial rays 116, the reflected rays 118 remain parallel, and the start to end ray path lengths depicted in FIG. 1 are all identical.

Figure 2:
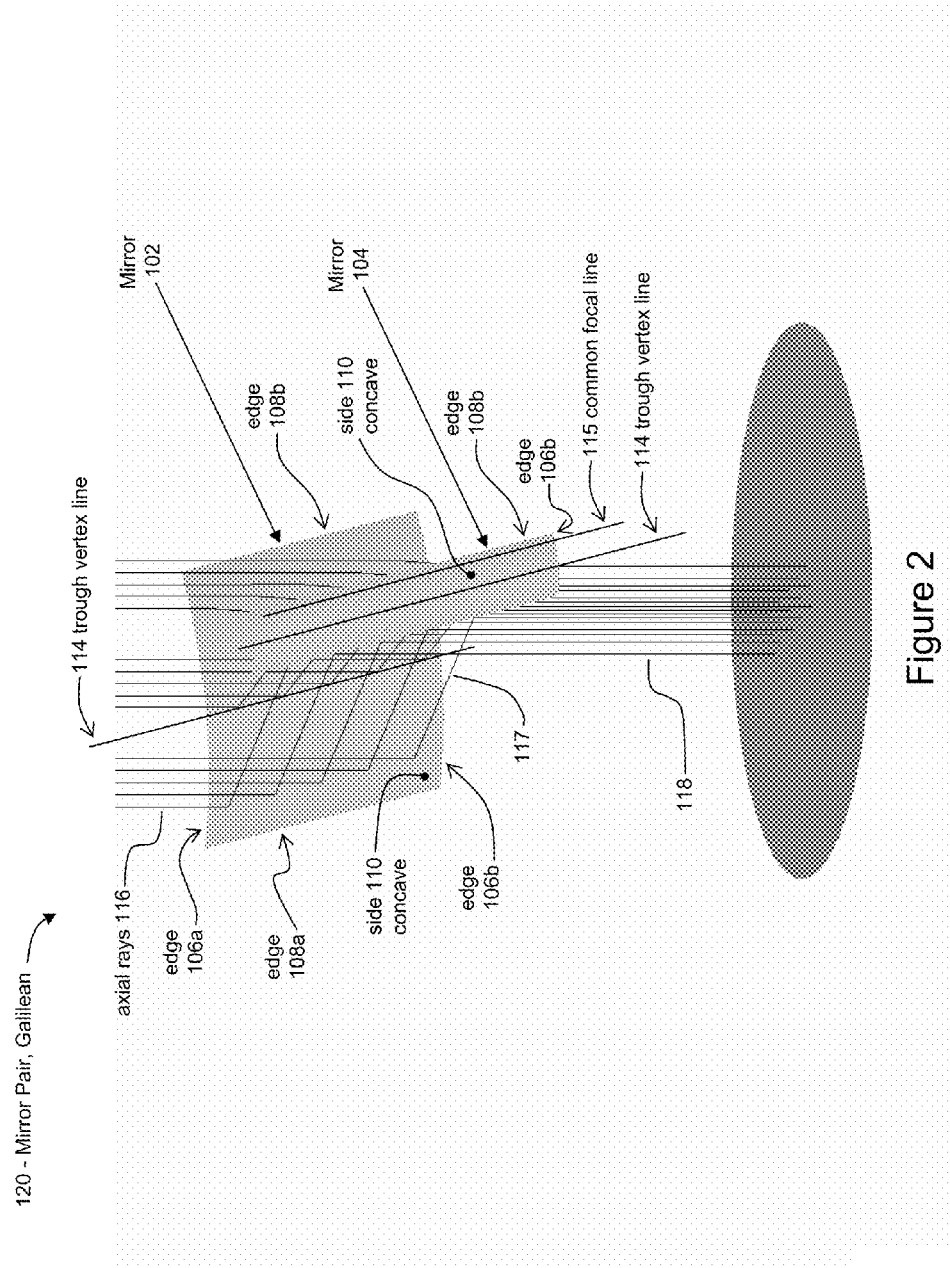
FIG. 2 illustrates an alternative mirror pair arrangement to that shown in FIG. 1, but still compressing axial light rays along a first dimension.

In another embodiment, depicted in FIG. 2, an initial pair 120 of parabolic trough mirrors 102 and 104 can be alternatively positioned in a Galilean configuration. In this configuration, their concave sides 110 face in the same direction to the common focal line 115 so that axial light rays 116, reflected by mirror 102, as rays 117, do not pass through the focal line 115, but instead are reflected by mirror 104, as rays 118, before reaching the focal line. Again axial rays 116, and reflected rays 118 remain parallel, and the start to end ray path lengths depicted in FIG. 2 are all identical.

Simple curvature, parabolic trough mirrors are believed to be advantageous as an alternative to mirrors having a compound curvature shape for simplicity, cost, ease of alignment, and other reasons. Never the less, it is contemplated that other mirror shapes may perhaps be used in other embodiments in lieu of the parabolic trough mirrors described. Specifically troughs with circular or asphere profiles may substitute for the parabolic cross section in refined optical designs. These designs often incorporate additional optical elements such as lenses to minimize off axis aberrations. Similarly in the other cross section, deviations from a flat mirror may be used to minimize off axis aberrations produced by the orthogonal pair of mirrors.

Regardless of whether the mirrors 102 and 104 are placed with their concave sides 110 facing one another or facing in the same direction as shown in FIG. 1 or 2 respectively, parallel light rays 116 reflected by the first and larger mirror 102, (sometimes referred to as the compressor mirror), are squeezed or compressed in one dimension or direction extending between the mirrors 102 and 104, and then made parallel again by being reflected off the second and smaller mirror 104, (sometimes referred to as the parallelizer mirror). The different parabolic curvatures of the compressor and parallelizer mirrors 102 and 104 provide different focal lengths $F_1$ and $F_2$, the ratio of which results in a compression factor $C=F_1/F_2$ for light rays 116 and 117 impinging upon the mirrors 102 and 104 respectively. Because of the compression factor C, which is about 5.0 in the exemplary embodiments shown in the Figures, the light rays 117 reflected off the smaller parallelizer mirror 104 are compressed or condensed into a smaller cross sectional area that is the inverse of C, or about one fifth (20%) of the cross sectional area of the light rays 116 reflected off the compressor mirror 102.

Figure 3:
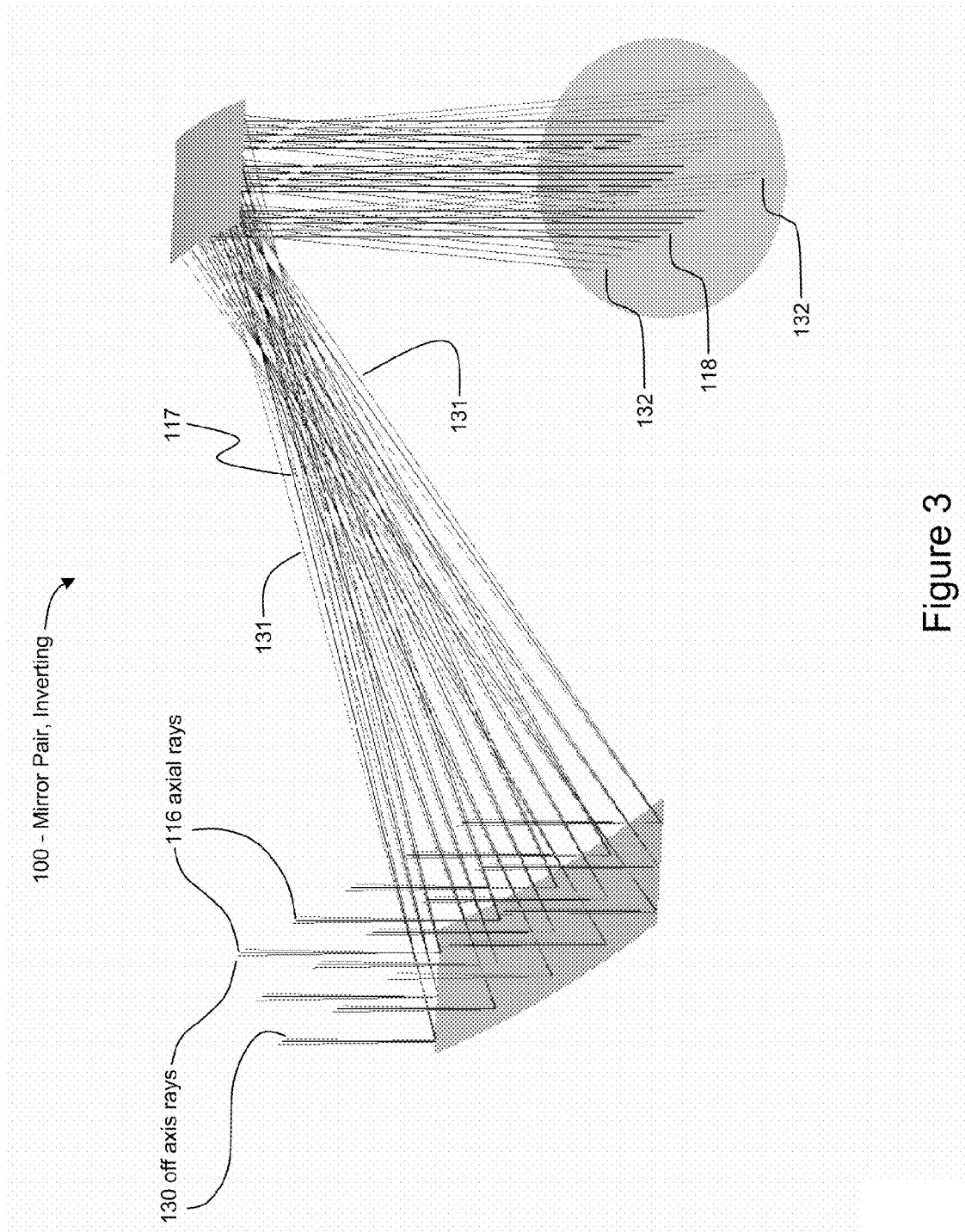
FIG. 3 illustrates the mirror pair arrangement shown in FIG. 1 compressing axial light rays and non-axial rays.
Figure 4:
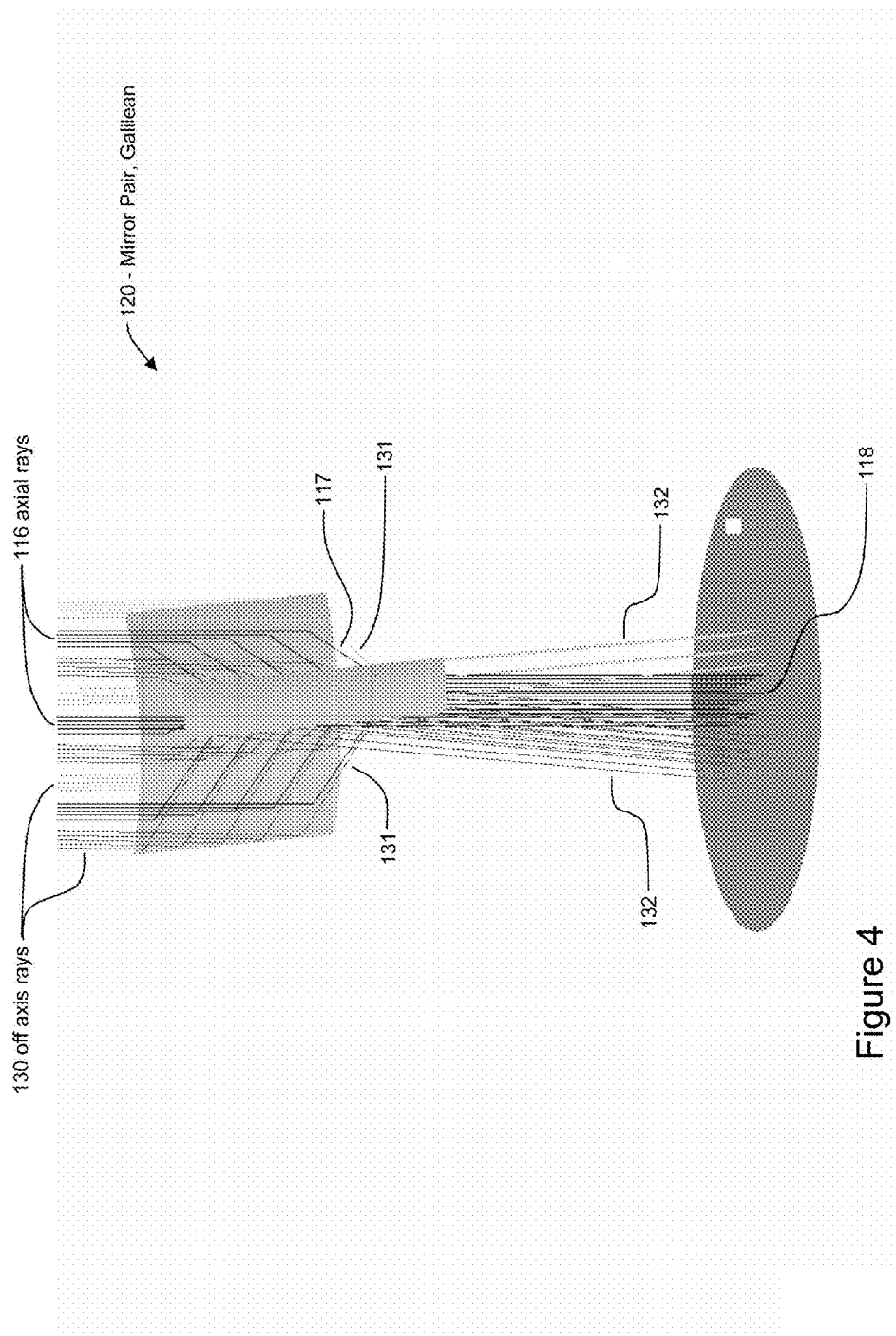
FIG. 4 illustrates the mirror pair arrangement shown in FIG. 2 compressing axial light rays and non-axial rays.

Additionally, and as shown in FIGS. 3 and 4, parallel non-axial light rays 130 reflected by the mirrors 102 and 104 undergo a compensating angular magnification that conserves radiance (power per area per solid angle) of the reflected light from the parallelizer mirror 104. For example, and as shown in FIGS. 3 and 4, the angular magnification results from light rays 130 that are originally one degree off axis from the parallel axial light rays 116, being reflected from the compressor mirror 102 as rays 131 and then reflected from the parallelizer mirror 104 as rays 132, to be reflected approximately 5 degrees off axis from the parallel light rays 118 reflected from the parallelizer mirror 104. This shows an increase in angle compensating for the decrease in cross section area, to provide the same radiance as that originally incident on the compressor mirror 102.

Figure 5:
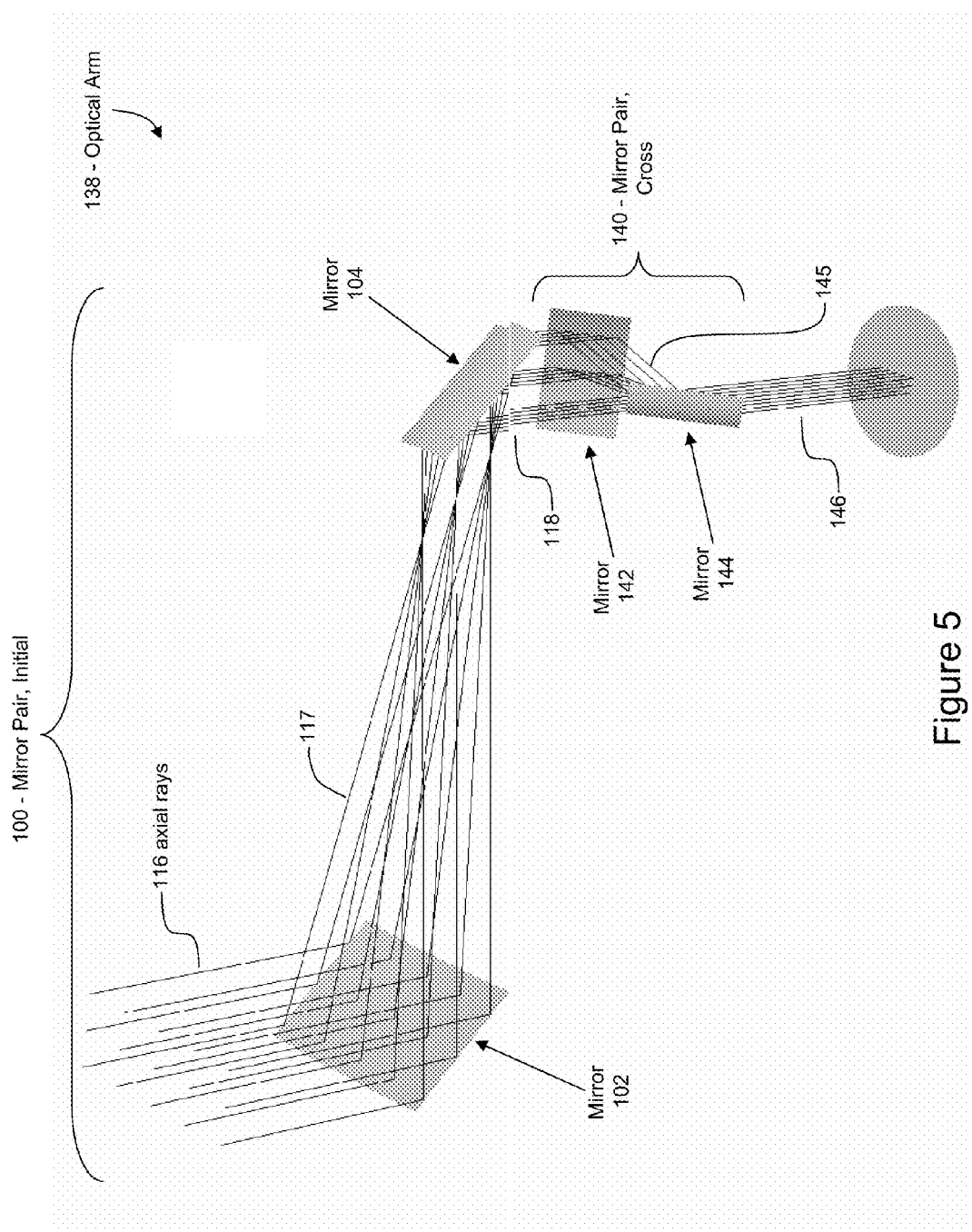
FIG. 5 illustrates an orthogonal arrangement of mirror pairs to compress light rays along a first dimension and along a second dimension.
Figure 6:
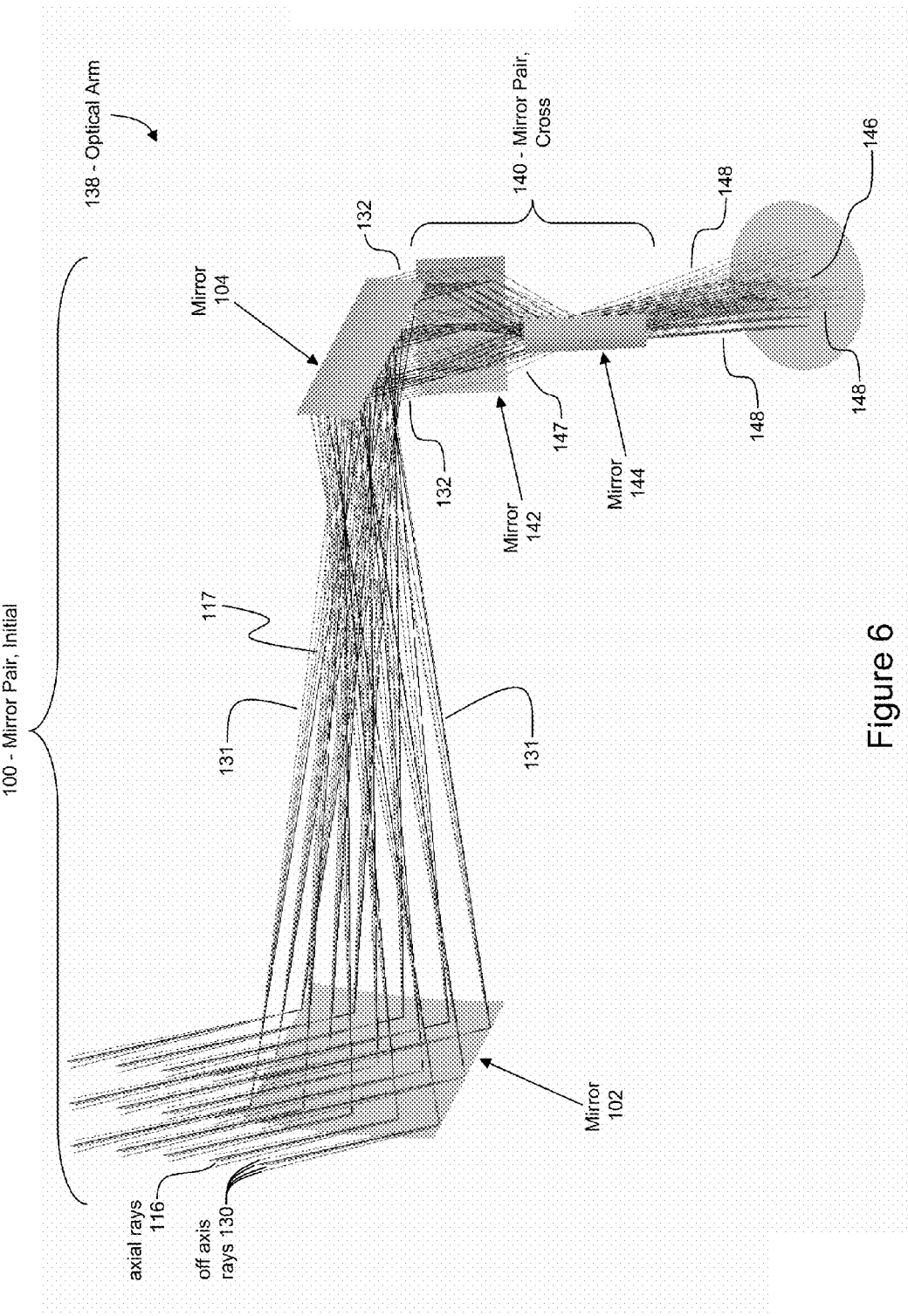
FIG. 6 illustrates the orthogonal arrangement of mirror pairs shown in FIG. 5 with axial and non-axial light rays.

Such light compression techniques can be further extended, as shown in FIGS. 5 and 6, by assembling an optical arm 138 including, for example, the initial mirror pair 100 of FIGS. 1 and 3 (or the mirror pair 120 shown in FIGS. 2 and 4) with another mirror pair 140 having mirrors 142 and 144 similarly shaped to the parabolic trough shaped mirrors 102 and 104 described above, but having still other sizes of mirrors 142 and 144 that receive the light from the first mirror pair 100. The second mirror pair 140, sometimes referred to as a cross pair of mirrors, may be positioned at right angles to the initial pair 100 and operate in a similar fashion to further compress axial parallel light rays 116 (FIG. 5) and non-axial parallel light rays 130 (FIG. 6). That is, collected light may be compressed into a smaller cross sectional area in one dimension as it passes between the initial pair of mirrors 100, and then again compressed in the other dimension into an even smaller cross sectional area as it passes between the cross pair of mirrors 140 that are orthogonally arranged to the initial mirror pair 100. The effective compression factor of both mirror pairs 100 and 140 in the optical arm 138 for the gathered light is the product of the compression factors C of each pair of mirrors 100 and 140. Thus, for example, if each mirror pair 100 and 140 has a respective compression factor C of approximately 5.0, the effective compression of both mirror pairs 100 and 140 functioning together in the optical arm 138 is approximately 25.0, resulting in significant reduction in cross sectional area of output light relative to input light. In the example shown in FIG. 5, rays 118 from the parallelizer mirror 104 of the initial mirror pair are reflected by the concentrator mirror 142 of the cross mirror pair 140, rays 145, and then are reflected by the parallelizer mirror 144 of the cross mirror pair 140, rays 146. The cross sectional area of the output light rays 146 is $\frac{1}{25}^{th}$ or 4% of the area of the light rays 116 originally collected with the compressor mirror 102 of the initial pair 100.

Also, initially parallel axial light rays 116 incident on the compressor mirror 102 of the initial mirror pair 100 remain aligned and parallel, rays 146, when reflected off the parallelizer mirror 144 of the cross pair of mirrors 140, thereby retaining a perpendicular wavefront in phase as it passes through the optical system. Additionally, as shown in FIG. 6, parallel non-axial light rays 130 incident on the compressor mirror 102 of the initial mirror pair 100, exit the initial mirror pair 100 reflected by mirror 104 as rays 132. These parallel non-axial light rays 132 reflect off the concentrator mirror 142 of the cross mirror pair 140, as rays 147, which in turn reflect off the parallelizer mirror 144 of the cross mirror pair, as rays 148. The exiting rays 148 from the optical arm 138 have an angular magnification relative to the exiting axial rays 146 in both orthogonal dimensions that conserves radiance (power per area per solid angle).

While the illustrated optical arm 138 in FIGS. 5 and 6 is illustrated with the initial mirror pair 100 having the concave sides of the mirrors facing one another, inverting configuration, it is contemplated that the initial pair 120 shown in FIGS. 2 and 4 could likewise be utilized in lieu of the initial pair 100 if desired. That is, an optical arm could be constructed with the concave sides of the mirrors facing in the same direction, Galilean configuration, in either of the initial mirror pair or the cross mirror pair of the arm if desired.

Figure 7:
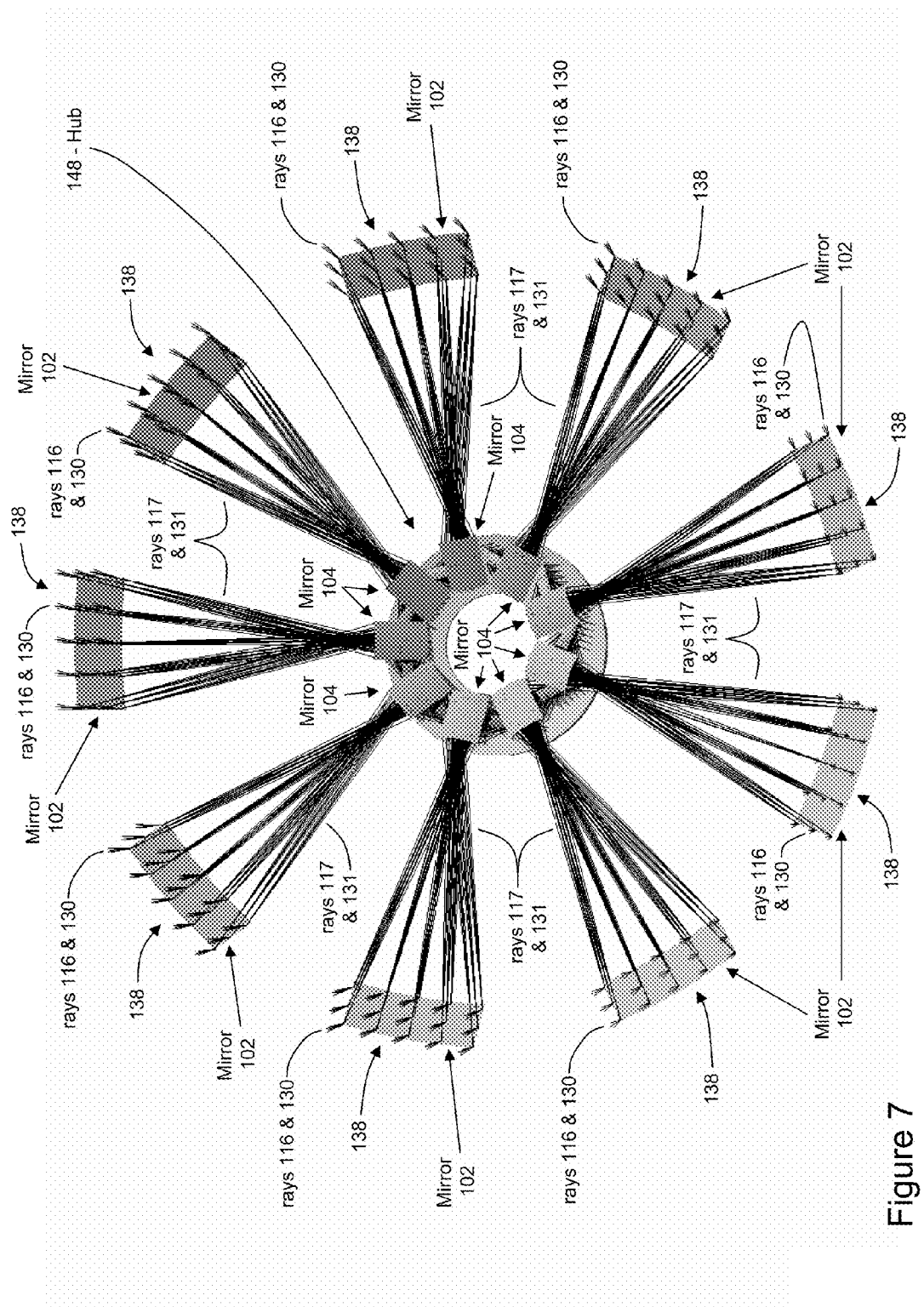
FIG. 7 illustrates a Golay type arrangement of multiple optical arms for a telescope.

As shown in FIG. 7, a number of optical arms 138 may be repeated in a circumferential pattern with the cross mirror pairs arranged in a relatively compact hub-like arrangement 148 and the initial mirror pairs extending radially outwardly from the hub, 148. Each arm 138, or the mirror elements defining each arm 102, 104, 142 and 144; may be individually supported and be generally independent from the other arms 138, eliminating any need for a superstructure that spans the entire outer diameter of the overall system. Such arrangement of optical arms 138 gathers light from an annular region defined by the compressor mirrors 102 of the initial mirror pair of the optical arms 138. In each arm 138, the collected light from the compressor mirror 102 is fed to the parallelizer mirror 104 of the initial mirror pair 100, is fed from the parallelizer mirror 104 to the compressor mirror 142 of the cross mirror pair 140, is fed from the compressor mirror 142 to the parallelizer mirror 144 of the cross mirror pair 140. In terms of the parallel axial rays; rays 116 reflect as rays 117, these reflect as rays 118, which reflect as rays 145, and then reflect as rays 146. For the parallel off axial rays; rays 130 reflect as rays 131, these reflect as rays 132, which reflect as rays 147, then reflect as rays 148. Ultimately, FIGS. 8 and 9, the collected light is fed from the parallelizer mirror 144, rays 146 and 148, into a relatively small diameter Cassegrain, Schmidt, or other type of telescope 150. The collected light is projected by the telescope 150, axial rays 156 and off axial rays 158, to a focal plane 152 for viewing purposes.

While the optical arms 138 in the illustrated embodiments include two sets of mirrors, namely an initial mirror pair and a cross mirror pair, it is understood that additional optical elements may be provided in a further and/or alternative embodiment to provide for focal length adjustment, pointing, adaptive optics, and aberration correction.

Figure 8:
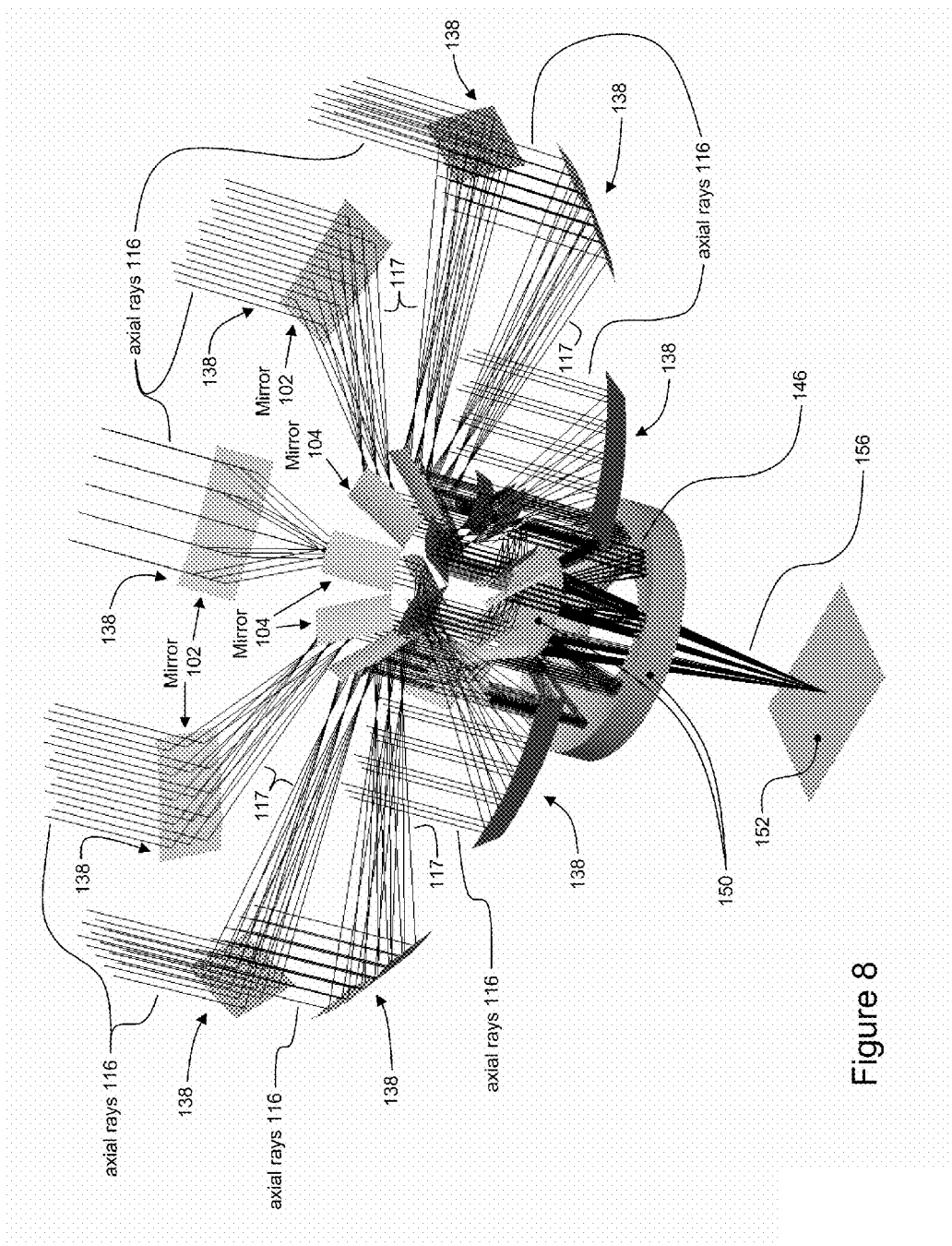
FIG. 8 is a perspective view of the mirror arrangement shown in FIG. 7 with axial light rays.
Figure 9:
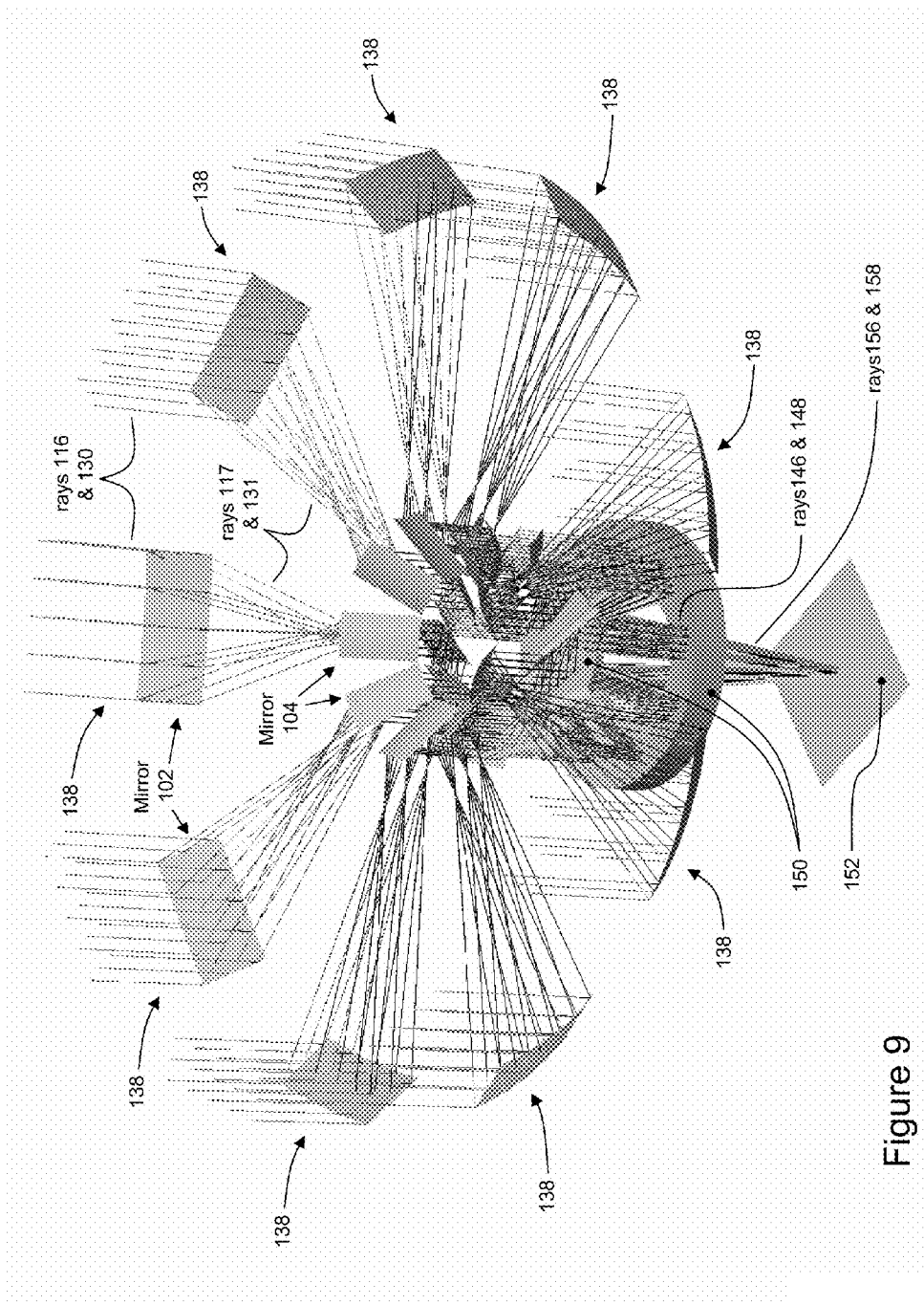
FIG. 9 is a perspective view of the arrangement shown in FIG. 7 with axial and non-axial light rays

In the example shown in FIGS. 8 and 9, nine optical arms 138 are repeated with equal spacing to form an optical collection system for a telescope, with each arm providing an exemplary compression factor of about 25.0. FIG. 8 illustrates axial light rays 116 coming from directly above the mirrors 102 of the initial mirror pairs 100 on the outer periphery of each optical arm 138. FIG. 9 shows the axial rays 116 together with two slightly off axis ray bundles 130 and their image points on the focal plane 152. The arrangement produces a multiple aperture, Golay type telescope. An odd number of equally sized, equally spaced apertures, with at least half the annulus area, gives a configuration having all optical baselines, (direction and length), across the large diameter of the annulus. With all baselines present, the final telescope image diffraction limit resolution is essentially that of a telescope with the outside diameter of the annulus.

Because the optical arms 138 reduce the cross-sectional area of input parallel light beams while keeping it in phase and still parallel as it is output, a large ring of multiple apertures providing light for the focusing telescope 150 may be utilized to collect light and send the light to a much smaller telescope structure while retaining the diffraction limit resolution of the large ring. This will allow very large (e.g., 100 meter diameter) astronomical telescopes to be built as multiple smaller independent moving optical arm structures 138 that are located close to the ground instead of a single large tall moving structure as in conventional astronomical telescope systems.

Additionally, the optical system, defined by the collection of optical arms 138 separates the light gathering from the light focusing in a telescope structure. This allows a much smaller telescope to focus the light after it has been gathered and compressed or squeezed into a much smaller cross-sectional area.

To properly collect parallel light into the telescope 150 so that it can substantially be focused to a single point, using the above-described optics concepts in each of the optical arms 138, the compression factors C and corresponding angular magnification of light must be equal in the two orthogonal directions of the mirror pairs 100 and 140 in each arm 138, and each arm must have the same compression factor. If these are not equal, the final image will be smeared due to superimposing different amounts of magnification from each arm 138. Additionally, the initial and cross mirror pairs 100 (or 120) and 140 of parabolic trough mirrors must both be in either an inverting, or a Galilean configuration, and all arms must have the same configuration. If they are mixed, the final image will be smeared because off axis light rays 130, if flipped in only one plane or inconsistently between arms, will come to a separate focus for different arms 138.

The optical systems including the arms 138 can be used to create a very large astronomical telescope 100 meters or more in outer diameter. The basic arrangement would be similar to that described above, but with twenty-five or more arms 138 and an effective compression factor of as much as 100 in one example. The initial compressor parabolic trough mirrors are positioned in a large circle, and the last three elements (the initial parallelizer mirror, the cross pair compressor mirror, and the cross pair parallelizer mirror) of each arm 138 form a hub similar to the hub 148 in the center as shown in FIGS. 7 through 9. A series of optical flats for each arm 138 can be provided to direct the squeezed and gathered light to a nearby vertically pointing fixed telescope. In further embodiments, having a fixed telescope which always points vertically allows the possibility of using a liquid metal mirror for this telescope that could have a variable parabolic shape determined by its rate of rotation.

A significant advantage occurs from using many optical arms. As more initial compressor parabolic trough collector mirrors are used in the circle for the telescope, the smaller in width each individual mirror becomes. This makes the parabolic cross section of the mirrors more similar to a circular cross section. It also makes the ratio of the mirror's focal length to its width larger, and gives a larger f/# for each mirror in the initial mirror pair in each arm. The effect of this is to reduce the amount of off axis aberration in the optical system. A single primary mirror having the same collection diameter would have to have a very much larger focal length, (telescope depth), to achieve the same f/#.

To track the apparent motion of astronomical objects of interest, it is necessary to point the optical system in different directions. The optical system described herein can be pointed in different directions without moving the entire telescope structure, thereby reducing costly structural support, actuator and control components common to existing large telescope systems.

More specifically, instead of moving the entire telescope structure, each arm 138 of the optical system may be individually pointed in a direction of interest by tilting the initial compressor mirror 102 about an axis that is normal to a plane formed by its vertex line and focal line, and then rotating the mirror about its vertex line. The initial parallelizer mirror 104 in the hub 148 can then be correspondingly tilted, which then in turn causes the rest of the hub 148 to have to physically point in the desired direction. The light from the tilted hub 148 can be directed to the fixed telescope by adjusting optical flats that also can be used to equalize the path length from each arm. In another embodiment, it may be possible to reduce or eliminate the overall hub motion by placing additional adjustable optical flats between some of the parabolic trough mirrors.

As the initial pair of mirrors 100 (or 120) in each arm 138 of the optical system is re-oriented, their focal lines will no longer be aligned unless another adjustment is made. One way to make the adjustment includes changing a separation or distance between the compressor and parallelizer mirrors 102 and 104 by moving them closer together or farther apart until their focal lines once again match. Linear actuators and the like could be provided for adjusting the distance between the mirrors 102 and 104 at locations close to the ground. Another way to make the appropriate adjustment would be to change the focal lengths of the compressor and parallelizer mirrors 102 and 104 in the initial mirror pair 100 (or 120), while maintaining their ratio of focal lengths to keep a constant compression factor C. The focal length may be changed, for example, by bending or flexing the mirror troughs while maintaining a parabolic cross-sectional shape. Because the mirror troughs have only one dimensional curvature, they can be flexed or bent to a much greater extent with much more control and much less material stress than compound curvature mirrors. In such an embodiment, a final operation would also be necessary to maintain a constant wavefront in phase. That is, the path lengths through each arm 138 in the optical system would be kept equal by adjusting optical flats for each of the arms 138. For a large telescope, an adaptive optical element will need to be included somewhere within the entire optical train to remove atmospheric distortion from the image.

By separating the function of light gathering from the function of light focusing, no net focusing is taking place in the squeeze optical system and the arms 138 are free to independently change lengths as needed to provide bore sight pointing while keeping the wavefront of all the collected light in phase. In contrast, if the light that was being gathered was also being focused, as in most current multiple aperture systems, the focal lengths of each arm would have to change to provide different path lengths; but that in turn would produce different magnifications from each arm smearing the image. The separation of functions thus allows the diffraction limiting light gathering to be done within a very shallow depth compared to the overall diameter of the optical system.

Separation of the light gathering into two orthogonal components in each arm 138 further allows ease of alignment at a much lower cost than in conventional telescopes, because the mirrors may be aligned one at a time in each arm 138 to systematically and sequentially build up an overall alignment.

As an example of a potential application of the concepts described above, a 100 meter diameter astronomical telescope is envisioned having 25 initial compressor mirrors, each being about 6½ meters wide and spaced about 12½ meters apart positioned above the ground in a 100 meter diameter circle. The optical system would reflect star light with a horizontal compression factor of up to about one hundred to a central hub containing the last three mirror elements for each of the 25 arms. This hub would direct the gathered light using optical flats to a fixed Cassegrain or other telescope pointing vertically upward. A number of adjustments would allow the 25 initial collectors to individually track an astronomical object.

It is now believed to be evident that the optical arms provide for the use of an increased number of mirrors, but of reduced size in comparison to conventional astronomical telescope systems. The use of smaller, independently movable mirrors located closer to the ground present significant opportunities for cost reduction compared to conventional optical telescope systems using compound curvature primary mirrors like paraboloids.

This written description uses examples to disclose the optical concepts and constructions described, including the best mode, and also to enable any person skilled in the art to practice the concepts disclosed, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optical system comprising:
    an optical arm comprising a first mirror pair and a second mirror pair, the second mirror pair being arranged orthogonally to the first mirror pair, and each of the first and second mirror pairs adapted to compress a cross sectional area of parallel, gathered light rays sequentially first in one dimension and then in the other dimension to a reduced cross sectional area of parallel light rays, wherein one of the first and second mirror pairs includes a first mirror and a second mirror each having a concave side and a convex side, the concave sides facing in a same direction, a common focal line associated with one of the concave sides and the convex sides of both mirrors, and wherein the first mirrors compress the light and the second mirrors make the light parallel again.

2. The optical system of claim 1, wherein the first mirror pair and the second mirror pair include at least one parabolic trough mirror.

3. The optical system of claim 1 wherein each of the first mirror pair and the second mirror pair comprise parabolic trough mirrors, said parabolic trough mirrors comprising common focal lines.

4. The optical system of claim 1, wherein the first mirror pair and the second mirror pair comprise an initial mirror pair, and a cross mirror pair, the cross mirror pair being fed light from the initial mirror pair.

5. The optical system of claim 1, wherein one of the first and second mirror pairs includes a first mirror and a second mirror each having a concave side and a convex side, the concave sides facing one another with a common focal line between the concave sides.

6. The optical system of claim 1, wherein at least one of the mirrors in the first and second mirror pairs has a variable parabolic shape.

7. The optical system of claim 1, wherein a distance between opposing mirrors in one of the first and second mirror pairs is adjustable.

8. The optical system of claim 1, further comprising a telescope comprising a focusing part, the light gathered from the first and second mirror pair being directed into the focusing part of the telescope.

9. An astronomical telescope system, comprising:
    a telescope; and
    an optical system comprising a plurality of independent optical arms feeding light into the focusing part of the telescope, the optical system gathering parallel light rays over a first cross sectional area and compressing the gathered light rays to a second cross sectional area of parallel light rays that is less than the first cross sectional area,
    wherein the telescope comprises one of a Golay telescope, sending light that has been gathered by the optical system to a Cassegrain, Schmidt, or other type of focusing telescope.

10. The telescope system of claim 9, wherein at least one of the plurality of optical arms comprises a first mirror pair and a second mirror pair, the second mirror pair being arranged orthogonally to the first mirror pair, and each of the first and second mirror pairs adapted to compress a cross sectional area of gathered light rays sequentially first in one dimension and then in the other dimension to a reduced cross sectional area.

11. The telescope system of claim 10, wherein the first mirror pair and the second mirror pair include at least one parabolic trough mirror.

12. The telescope system of claim 11 wherein each of the first mirror pair and the second mirror pair include parabolic trough mirrors with common focal lines.

13. The telescope system of claim 10, wherein each of the first mirror pair and the second mirror pair include a first mirror to compress the light and a second mirror to make the light parallel again.

14. The telescope system of claim 10, wherein the first mirror pair and the second mirror pair comprise an initial mirror pair, and a cross mirror pair, the cross mirror pair being fed light from the initial mirror pair.

15. The telescope system of claim 10, wherein the first and second mirror pairs includes a first mirror and a second mirror each having a concave side and a convex side, the concave sides facing one another with the common focal line between them.

16. The telescope system of claim 10, wherein the first and second mirror pairs includes a first mirror and a second mirror each having a concave side and a convex side, the concave sides facing in the same direction with the common focal line to the same side of both mirrors.

17. The telescope system of claim 10, wherein at least one of the mirrors in the first and second mirror pairs has a variable parabolic shape.

18. The telescope system of claim 10, wherein a distance between opposing mirrors in one of the first and second mirror pairs is adjustable.

19. The telescope system of claim 10, wherein the plurality of optical arms are arranged in an annular ring with the first mirrors of the first mirror pair forming an aperture such that all direction and length baselines, across the outside diameter of the ring are formed by the aperture.

20. The telescope system of claim 10, wherein the plurality of optical arms can be independently adjusted to all point in the same direction, and further to be continually adjustable to track objects across the sky.

* * * * *